March 19, 1935. W. MIEHE 1,994,530
POWER CAR MOVER
Filed Aug. 8, 1933 2 Sheets-Sheet 2
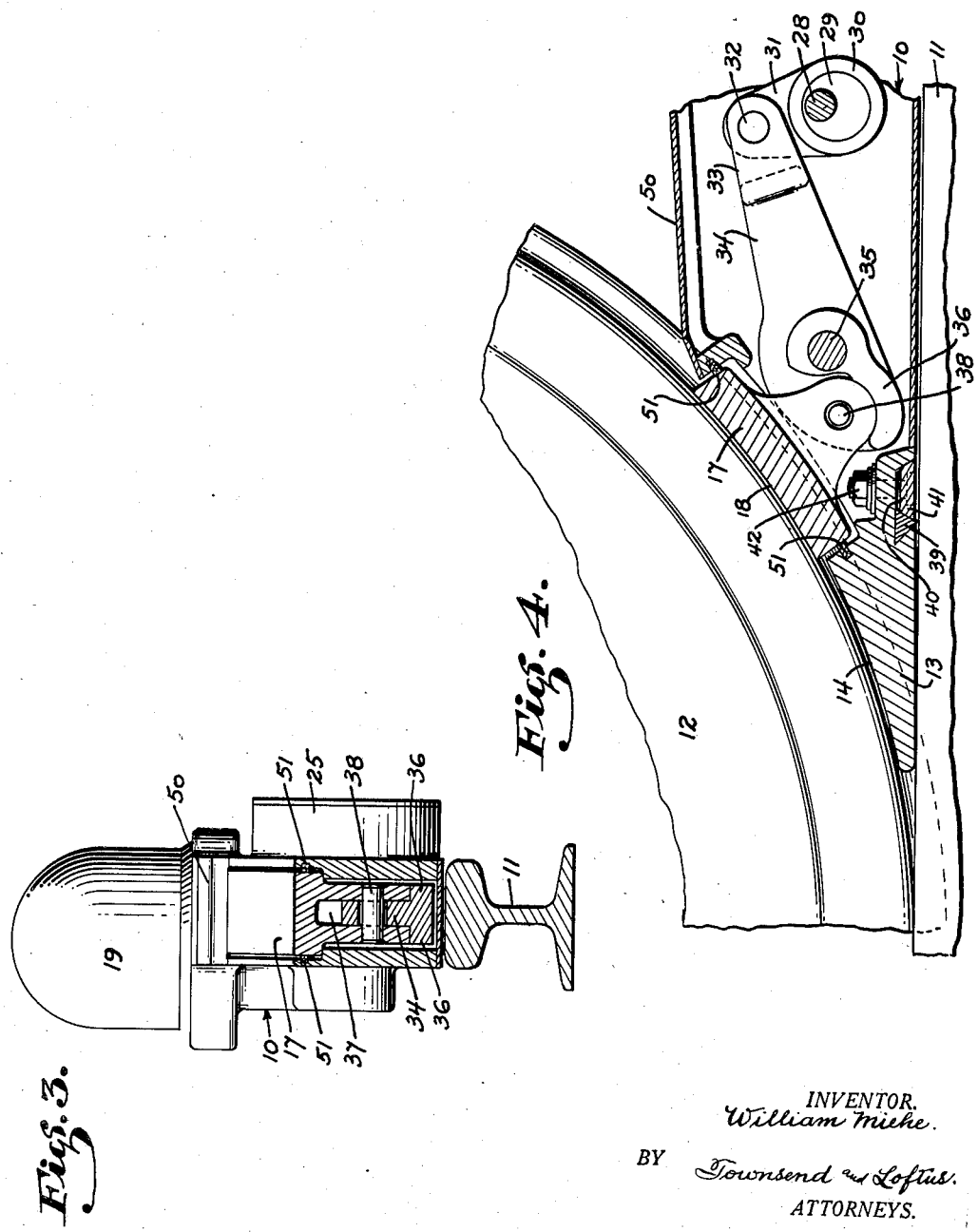
INVENTOR.
William Miehe.
BY Townsend and Loftus.
ATTORNEYS.

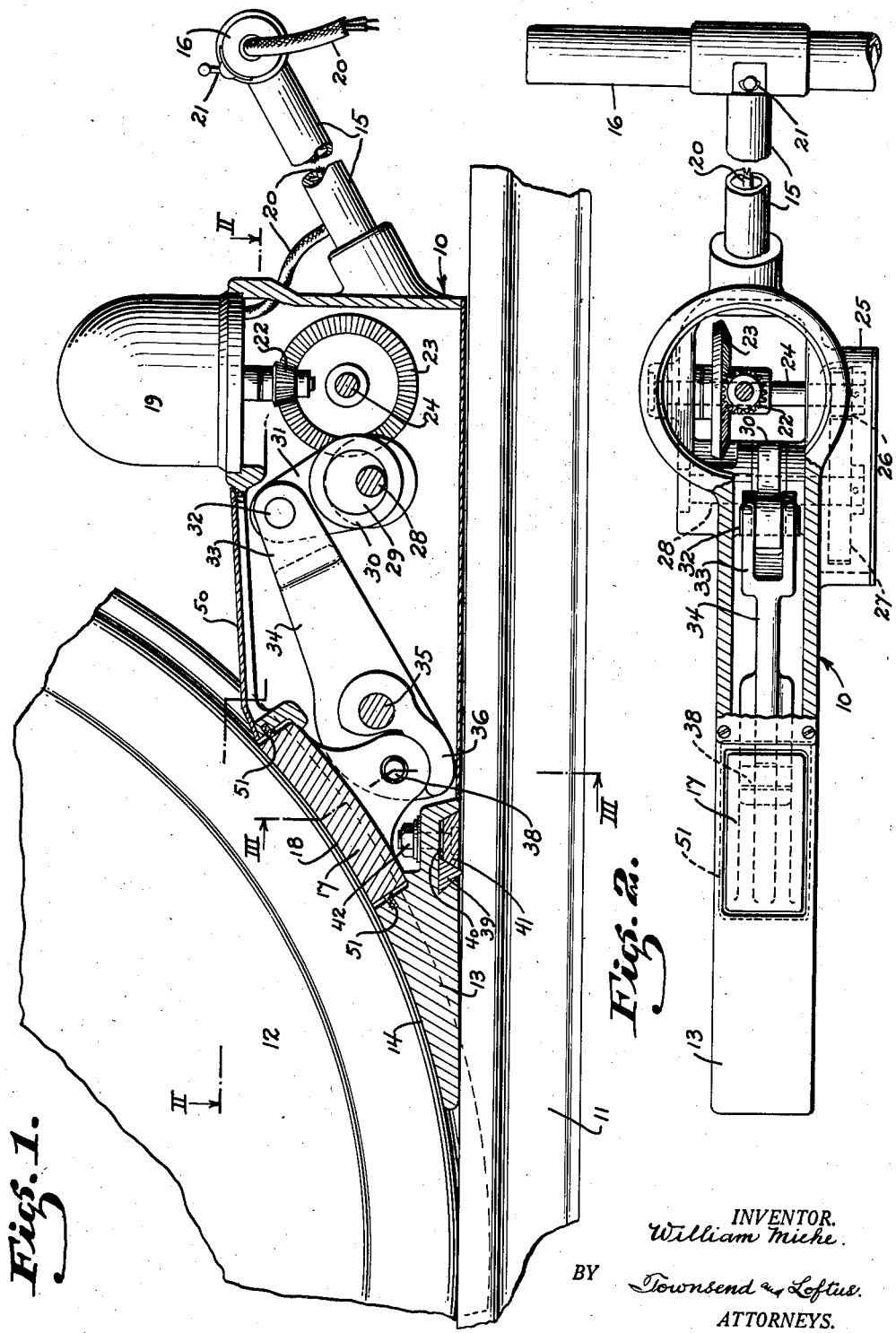

Patented Mar. 19, 1935

1,994,530

UNITED STATES PATENT OFFICE 1,994,530

POWER CAR MOVER

William Miehe, San Mateo, Calif.

Application August 8, 1933, Serial No. 684,171

3 Claims. (Cl. 254—38)

This invention relates to car movers of the kind employed for the purpose of shifting railway cars for short distances along the tracks at yards or terminals in the absence of a locomotive or other switching apparatus.

It is the object of the present invention to provide an improved car mover, to provide a device that is small and relatively light so as to facilitate handling and using of the same, to provide a car mover which can easily be pushed along a rail to engage a car wheel and preferably which embodies motor driven means for exerting pressure between the rail and wheel to impart motion to the car but which may also be driven by hand, and to embody all of said features in a structure that is simple mechanically and sufficiently durable to withstand the service it is intended to perform, and that is inexpensive to manufacture and operate.

This object is attained through the provision of a body member shaped to fit between a rail and a car wheel, and having a handle by means of which an operator may move it to and maintain it in this position. The upper portion of the body member which engages the car wheel carries a shoe mounted for limited reciprocal movement to and from the wheel, whereby it will engage the wheel to cause it to roll along the rail. The body member encloses reduction gearing and levers which may be driven by a motor or by hand to impart the said reciprocal motion to the shoe.

One form of my invention is illustrated in the accompanying drawings to which reference will be made in greater detail in the following specification. In the specification further advantages of the invention are made apparent.

In the drawings—

Fig. 1 is a central vertical longitudinal section of a car mover constructed in accordance with my invention;

Fig. 2 is a sectional view of the same, taken on the line II—II of Fig. 1;

Fig. 3 is a section taken on the line III—III of Fig. 1; and

Fig. 4 is a fragmentary sectional view, disclosing a different position of the operative parts illustrated in Fig. 1.

Referring more particularly to the drawings, I show a car mover which comprises a body member 10 in the form of a hollow casting adapted to rest upon a rail 11 beneath a car wheel 12 in the manner illustrated in Fig. 1. The forward end of the hollow body member 10 terminates in a solid toe member 13, the upper forward surface 14 of which may be formed on an arc having a radius equal to that of a standard car wheel. The lower surface of the toe member 13 is flat and forms an extension of the flat lower surface of the body member 10 so that the device will rest upon the upper surface of the rail. Lugs, of conventional design, may be employed to extend downwardly adjacent either one or both of the rail edges if desired. The use of such lugs as guide members is a matter of common practice, but as they are not always considered necessary, they are not illustrated in the accompanying drawings.

A handle 15 with a suitable cross-member 16 at its end is fitted to the rear end of the body member and extends upwardly therefrom at an angle and for a distance to make it convenient for an operator to slide the device along the rail until it reaches the position illustrated in Fig. 1 and then urge it forwardly with sufficient force to maintain it in contact with the car wheel as the car rolls slowly along the rails. A shoe 17 is fitted in the front forward face of the body member adjacent the solid toe 13 and is provided with a wheel-engaging face 18, which also may be curved on the radius of the wheel so as closely to conform to the shape of the rail-engaging periphery thereof. Power means are provided for imparting short reciprocal strokes to the shoe 17 toward and away from the wheel, so that the wheel is caused to roll and carry the car along the rail as long as the car mover is held between the rail and the wheel in the position illustrated in Fig. 1.

The power means referred to is illustrated as consisting of an electric motor housed in a casing 19 fitted to the upper rearward end of the body member. The motor, which is not shown in the drawings, may be a conventional electric motor energized by any suitable source through a two-wire conductor 20 which extends through the handle 15 and outwardly through one end of the cross-bar 16, as shown. A switch 21 is preferably conveniently located at the upper end of the handle 15 to control the circuit through the conductor 20 and thus facilitate energization and de-energization of the motor at the will of the operator.

While I have illustrated the use of an electric motor, it will be readily understood that an air motor or any other conventional power means may be used to accommodate the device to whatever source of power is convenient and economical.

The rotating shaft of the motor extends downwardly into the body member 10 and is fitted with a bevel gear 22 meshing with a larger bevel gear 23 fixed to a shaft 24. The shaft 24 extends transversely of the body member and is suitably journaled in bearings formed in the walls thereof, having one end extending outwardly into a gear casing 25, as illustrated in Fig. 2. This outer end of the shaft 24 is fitted with a gear 26 which meshes with a gear 27 fixed to a shaft 28, also journaled in the walls of the body member 10 transversely thereof.

Referring again to Fig. 1, the shaft 28 is shown as fitted with an eccentric 29. An eccentric strap 30 surrounds the eccentric 29 and is articulately connected by means of a link 31 and pin 32 to a bifurcated end 33 of a lever 34. The lever 34 is mounted for oscillating movement on a pivot pin 35, and its opposite end is provided with a pair of cradle-shaped bosses 36 which support the inner end of the shoe 17.

The details of the connection between the lever and shoe are best shown in Fig. 3 of the drawings, where the shoe 17 is shown as provided with a central recess 37 which receives the end of the lever 34. A loosely fitting pin 38 prevents separation of the shoe and lever, and also permits the slight pivotal movement necessary between these parts but does not, however, receive any of the thrust imparted to the shoe by the lever due to the engagement of the inner end of the shoe with the cradle-shaped bosses 36.

A cover plate 50 may be employed for closing the open upper side of the body member to protect the movable parts therein from dust and permit of their insertion and removal when necessary. The bottom of the body member may be integrally cast or may be also in the form of a removable plate. The body member may be filled with a lubricant so that all of the moving parts will be immersed therein and a grease retaining member 51 of any suitable material is employed to form a seal around the shoe 17 and prevent leakage of the lubricant.

In operation, when it is desired to change the position of a car on the rails, the car mover, as described above, is placed in the position illustrated in Fig. 1, the conductor 20 being connected with a source of electrical energy and of sufficient length to permit movement of the device from place to place. The switch 21 is then actuated to energize the motor, and operation of the motor imparts rotation to the eccentric 29 through the gears 22, 23, 26 and 27. Upon rotating, the eccentric 29, through the strap 30 and link 31, oscillates the lever 34 and thus causes reciprocation of the wheel-engaging shoe 17 in the direction of the radius of the car wheel. While the motor may be relatively small and require very little energy in operation, it should be noted that the gearing and leverage effect a reduction in the speed of operation and also impart a very short reciprocal stroke to the shoe 17. On the upward stroke of the shoe 17, the wheel is caused to roll away from the car mover, and the operator, by pushing upon the handle 15, causes the device to follow the wheel, thereby causing the car to roll any desired distance. In Fig. 4 of the drawings the shoe is illustrated as having moved to the end of its upward stroke.

In order to prevent the movement of the shoe from sliding the car mover backwardly along the rail instead of rolling the car forwardly, I have provided a hard steel point 39, which is in the form of a triangular shaped bar extending transversely through a slot 40 formed in the lower surface of the toe 13. A wedge 41 may be held in the slot 40 by means of a bolt, as illustrated at 42, and when so held will serve to retain the point 39 in position with a sharp edge thereof projecting slightly below the rail-engaging surface of the body member. As the movement of the shoe 17 tends to move the car forwardly, the point 39 bites into the rail sufficiently to prevent backward sliding of the car mover.

While I have illustrated and described a car mover provided with mechanical operating means it will be apparent that a hand crank may be substituted for the motor described to actuate the shoe 17, the gearing and leverage illustrated being suited to operation by any source of power.

From the foregoing it will be apparent that I have provided a car mover which, though simple and relatively light in construction, may be operated by one man to move cars along a rail for a short distance with very little exertion on the part of the operator, even though the cars be of tremendous weight.

While I have shown a preferred form of my invention, it is to be understood that various changes may be resorted to in the construction and arrangement of its several parts within the scope of the appended claims.

Having described my invention, what I claim and desire to secure by Letters Patent is—

1. In a car mover, a housing adapted to rest on a rail, said housing having a rectangular opening formed therein, a shoe reciprocably mounted in said opening, mechanism within the housing for imparting reciprocal movement to said shoe to cause it to engage and move a car wheel on the rail, said housing being adapted to contain a lubricant to lubricate said mechanism, and a lubricant seal in said opening engaging said shoe to prevent leakage adjacent the opening.

2. A power car mover comprising a housing adapted to rest on a rail and having a surface at one end conforming to a portion of the periphery of a car wheel on the rail, a reciprocable shoe carried by said portion to engage and move the car wheel, a motor mounted on the opposite end of said housing and having a drive shaft extending vertically into the housing, a bevel gear on the motor shaft, a cross shaft in the housing, a bevel gear on said cross shaft in mesh with the first named bevel gear, an eccentric shaft geared to said cross shaft, an eccentric on said shaft, a lever pivoted in the housing, an eccentric strap and a link connecting the eccentric to one end of the lever, and a connection between the opposite end of the lever and said reciprocable shoe.

3. In a car mover, a housing adapted to rest on a rail and having a rectangular opening formed therein, a shoe reciprocably mounted in said opening, gear and lever means within the housing for imparting reciprocal movement to said shoe to cause it to engage and move a car wheel on the rail, said housing forming a receptacle for a lubricant for said gear and lever means, said opening having a continuous groove formed around its inner edge, and a packing member carried by said groove and engaging the shoe to prevent leakage of the lubricant between the shoe and the edge of the opening.

WILLIAM MIEHE.